March 3, 1942.  W. L. HANSEN ET AL  2,274,957

SYNCHRONOUS MOTOR

Filed April 22, 1940

INVENTOR
WILLIAM L. HANSEN
BY IRA N. HURST

ATTORNEYS

Patented Mar. 3, 1942

2,274,957

UNITED STATES PATENT OFFICE 2,274,957

SYNCHRONOUS MOTOR

William L. Hansen and Ira N. Hurst, Princeton, Ind., assignors to Hansen Mfg. Company, Inc., Princeton, Ind., a corporation of Indiana Application April 22, 1940, Serial No. 330,936

10 Claims. (Cl. 172—278)

This invention relates to electric motors, and in particular, to electrical synchronous motors such as are employed for operating clocks.

One object of this invention is to simplify the construction of slow speed electrical synchronous motors having self-starting characteristics and a relatively low current consumption for a given power output.

A more particular object is to provide a simplified construction of the magnetic field structure of a self-starting slow speed synchronous motor having field poles shaded by an undulating shading ring which passes around three sides of alternate poles as it proceeds around the field structure.

Another object is to improve the construction of that type of slow speed self-starting synchronous motor which has a field structure consisting of two spaced poles coming from opposite ends of a field core, the inner set of poles consisting of a disk with radially projecting fingers and the outer set consisting of a disk with axially projecting fingers. The improvement contemplated by the present invention consists in joining together the two spaced poles by a metallic connection, this connecting piece having a less cross sectional area than the area of each of said poles. The improved arrangement is such that the tips of the two sets of fingers are integrally joined together by this metallic connecting piece and the alternate poles of each set of fingers are shaded by an undulating shading ring extending around three sides of each shaded pole.

Still another object is to provide a slow speed self-starting synchronous motor having a field structure consisting of two spaced poles originating from a pair of disks positioned on opposite ends of a field core, all of the poles and one of the disks being integrally joined together, the other disk serving merely as a spacing member for some of the poles.

Still another object is to provide a slow speed self-starting synchronous motor having a field structure consisting of a plurality of disks mounted upon a magnetic hub surrounded by a field core, one set of disks mounted at one end of said hub having axially projecting pole pieces and the two other disks mounted at the opposite end of the hub having radially projecting pole pieces, the tips of which are metallically connected to the tips of the axially projecting pole pieces, the disks with the radial pole pieces being separated by a disk of non-magnetic material for shading one set of poles from the other.

The final and general object of our invention is to provide a simplified and inexpensive construction for a slow speed self-starting synchronous motor which is not only easy to fabricate but can be readily assembled, thus reducing the cost of manufacture of these motors.

The invention will be better understood when reference is made to the following description and the accompanying drawing in which Figure 1 is a top plan view of the improved motor of this invention with portions of the rotor structure and field coil structure broken away, respectively, to disclose the structure therebeneath;

Figure 1:
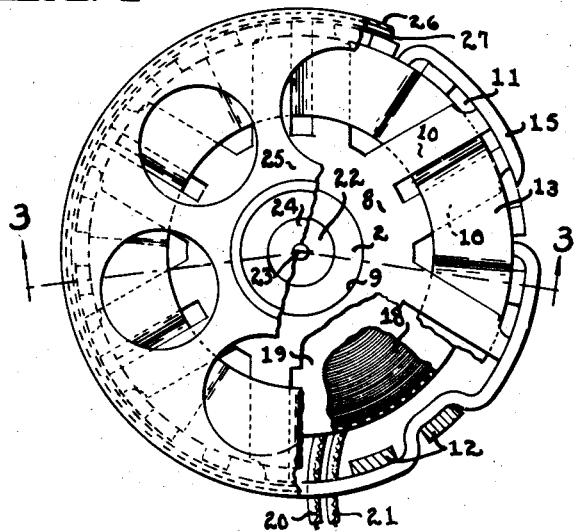
Figure 4:
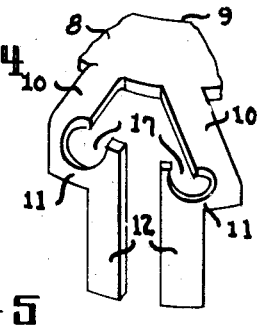
Figure 4 is a fragmentary perspective view of the radially and axially extending portions of the magnetic structure.
Figure 5:
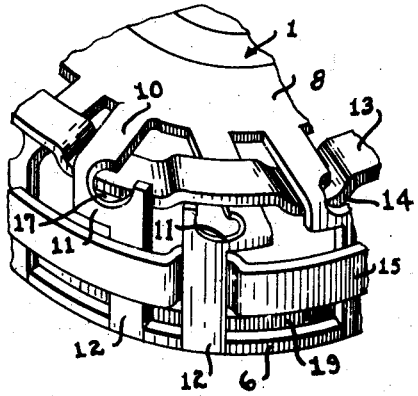
Figure 5 is an enlarged fragmentary top perspective view of the motor, shown in Figures 1, 2 and 3 with the rotor structure removed.
Figure 2:
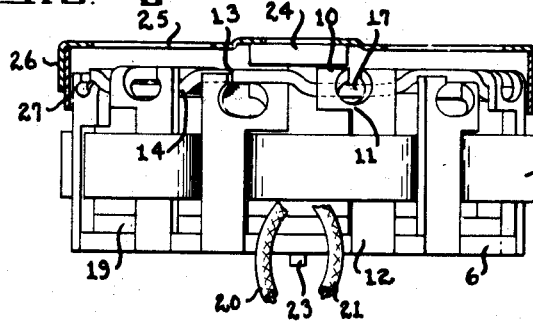
Figure 2 is a side elevation of the motor, shown in Figure 1, with the rotor structure shown in diametrical cross section in order to disclose the field structure more clearly.
Figure 6:
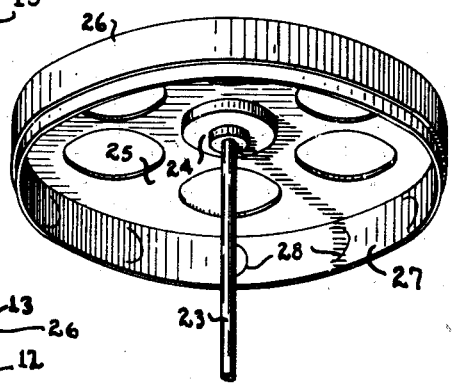
Figure 6 is a perspective view looking upwardly into the edge of a form of rotor which may be advantageously employed in connection with the improved motor.
Figure 3:
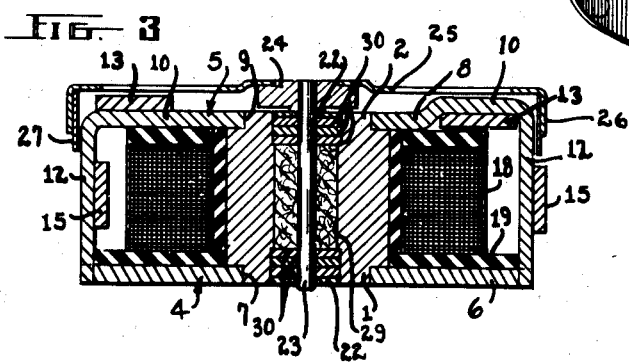
Figure 3 is an axial section taken through the motor of Figure 1, along the line 3—3 in Figure 1.

Referring to the drawing in detail, Figure 3 shows a preferred embodiment of the slow speed self-starting synchronous motor of this invention. This motor consists of a magnetic tubular hub 1 having reduced diameter portions 2 and 3, upon which are mounted the outer and inner field pole assemblies, generally designated 4 and 5, respectively. The outer pole structure 4 consists of a disk 6 having an aperture 7 by which it is mounted upon the reduced diameter portion 2, and the periphery of the disk is provided with a number of equidistantly spaced rectangular slots (not shown) which receive the ends of the axially or laterally extending pole pieces which will be described presently.

The inner field pole assembly 5 consists of a disk portion 8 (Figure 3) having an aperture 9 by which it is mounted upon the magnetic hub 2 and also has radially extending pole pieces 10 arranged in pairs around the periphery of the disk portion 8. The outer ends of the radially extending pole pieces 10 are metallically connected by the element 11 to pole pieces which extend upwardly from the lower disk 6. These last mentioned pole pieces are designated 12 on the drawing and their lower ends are received by the rectangular slots provided at the periphery of the lower disk 6. If desired, the metal around these slots can be peened over to hold the lower ends of the pole pieces 12 in place. As in the case of the radially extending pole pieces 10, the axial or lateral pole pieces 12 also appear in pairs. Each alternate pole piece 10 is shaded by an undulating ring 13 of non-magnetic metal, such as copper, this shading ring having undulating portions 14 passing around three sides of each alternate pole piece 10 so as to shade these particular pole pieces. The shading ring 13, however, merely passes across the front face of the remaining alternate pole pieces 10, and, therefore, does not shade these pole pieces.

There is a second shading ring 15 similar to ring 13 but serving to shade the alternate pole pieces 12. As in the case of the ring 13, the ring 15 extends around three sides of the alternate pole pieces 12 and in front of the remaining pole pieces 12 so as to shade the first mentioned pole pieces but not the last mentioned pole pieces. The shading rings 13 and 15 may be held in position in any suitable manner but we have found that friction with the contiguous surfaces is sufficient. These rings may be assembled with the magnetic structure in the following manner. The pole pieces 10 and 12, together with the connecting piece 11, are made out of the same stamping as the disk portion 8 and, therefore, are initially fabricated in a flat shape. The cross sectional area at the element 11 is rendered small by removing a portion of the metal, as indicated at the drilled hole 17. Assuming that the shading ring 13 has been given an undulating configuration in any suitable and well-known manner, the first step is to bend each alternate pole piece 10 vertically upwardly at the position where this pole piece joins with the disk portion 8. The upwardly extending portion of the shading ring 13 can now be laid flat on those pole pieces 10 which have not been bent upwardly. After the ring has been placed in position, the pole pieces which have been bent upwardly can now be flattened out so as to extend over the depressed portion of the shading ring 13. The shading ring 15 is now held in position and the pole pieces 12 are bent downwardly through ninety degrees and in such a way that every alternate pole piece extends along the outside of the shading ring 15 and within the depression formed in that ring, whereas the ultimate remaining pole pieces extend downwardly on the inside of the ring 15 where there are no depressions in the ring. The lower ends of the pole pieces 12 are then hammered into the rectangular slots in the lower disk 6 and permanently secured by peening or in any other suitable manner. It will be understood that before the magnetic structure is completely boxed in, the field coil is placed in position. The field coil 18 (Figure 3) is mounted in an annularly grooved insulating member 19, encircling the magnetic hub and having leads 20 and 21 for connection to a suitable source of alternating current. The magnetic hub is provided with an axial bore 29, the ends of which are closed by three washers 30 of fairly thick material and a thin washer 22 of hardened steel which serves as a thrust bearing for the rotor which will be described presently. The washers 22 and 30 are provided with a central opening which receives the shaft 23 of the rotor. The annular space within the bore 29 and between the innermost washers 30 is filled with a lubricant containing material, such as wicks, cotton waste, etc., the purpose of which is to provide a sealed-in source of lubricant for the shaft 23.

Mounted on the rotor shaft 23 is a hub 24 having a small diameter portion at the top and carrying a disk of non-magnetic lightweight material, such as aluminum, which terminates at its periphery in a downwardly extending flange. The disk and flange are designated as 25 and 26, respectively. The disk 25 is provided with a number of round openings equidistantly spaced around the disk to reduce the weight as much as possible. The flange 26 receives the magnetic portion 27 which constitutes the rotor proper and is in the form of a cylindrical band of hardened magnetic steel. The element 27 is radially thin and axially wide, light in weight and preferably in a single piece. The rotor 27 may consist of a plain band of steel which is sprung into the space within the flange 26, as is hereinafter explained. The rotor band 27 is provided with circumferentially spaced incisions 28, which serve to interrupt the magnetic path and in this manner to provide pole pieces around the rotor band. The disk 25 is so mounted with respect to the magnetic structure, depending upon the thickness of the hub 24, that the rotor element 27 is positioned adjacent the metal connecting element 11.

The incisions 28 may be provided in the steel band 27 in any suitable manner. It has been found convenient to punch the incisions and then to strike up the metal at the position of each incision, after which the struck up portions are pushed or bent back into alignment with the remainder of the strip. The strip may then be sprung into cylindrical shape and inserted within the flange 26, where it is held in place by its natural resilience.

In the operation of the motor, the leads 20 and 21 are connected to a source of alternating current, such as to the 110 volt, 60 cycle alternating current supplied for domestic lighting. Energization of the field coil 18 causes the magnetization of the field poles 10, 12 in alternate polarity as the current alternates. The shading rings 13 and 15, however, provide a phase lag in alternate outer and inner field poles so as to impart a starting torque to the rotor 27. By this means, the rotor is started in rotation and rotates at a synchronized speed, depending upon the number of poles with which the motor is provided. In the example shown, the motor has a speed of 600 R. P. M. for 110 volt, 60 cycle alternating current. Notwithstanding the fact that the pole pieces 10 and 12, which at any given instant are of opposite polarity, are connected together by the metal element 11, the motor shown and described hereinbefore has ample starting and operating torque, more than ample to start and to operate the largest clock mechanism. The fact that the cross sectional area of the metal element 11 is considerably less than the area of the pole pieces 9, 12, which reduction in area is obtained by the use of the drilled opening 17, assures that the amount of flux leakage from one pole to the other pole will be limited. The flux which does not pass through the metal connecting member 11, or does not pass through the air between these two poles, will intercept the polar portions between the incisions 28 on the rotor 27. The latter is, therefore, caused to rotate at a speed dependent on the alternation of the current supplied to the coil 18.

From the foregoing, it is evident that I have disclosed a very simple form of magnetic circuit in that the pole pieces 10 and 12 are formed out of the same material as the disk 8 and at the same time by a punching operation. The manner of positioning the shading rings 13 and 15 is also fairly simple in that the ring 13 necessitates merely an upward bend of each alternate pole piece 10, whereas the ring 15 is placed in position before the pole pieces 12 are bent downwardly from their flat initial position. The use of the metal member 11 makes the magnetic structure very rigid in that the pole pieces are permanently joined together and therefore, can not have a tendency to separate. It is apparent that the cross section of the metal connecting element 11 may be made as large or as small as is desired to give the proper rigidity to the magnetic structure and at the same time to limit the leakage flux to the proper amount.

It will be understood that we desire to comprehend within our invention such modifications as come within the scope of the claims and the invention.

Having thus fully described our invention, what we claim as new and desire to secure by Letters Patent is:

1. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially, a metal member integrally connecting the adjacent ends of said inner and outer pole pieces, and a rotor rotatably mounted adjacent said metal member.

2. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially, a metal member integrally connecting the adjacent ends of said inner and outer pole pieces, a rotor rotatably mounted adjacent said metal member, and a shading ring of ribbon-like form adjacent said cylindrical path and undulating in and out to shade alternate outer pole pieces.

3. In a synchronous motor, a magnetic core, a magnetic field member mounted on one end of said core and having outer pole pieces disposed axially in a substantially cylindrical path, a second magnetic field member mounted on the other end of said core and having inner pole pieces disposed radially, a metal member integrally connecting the adjacent ends of said inner and outer pole pieces, a rotor rotatably mounted adjacent said metal member, a shading ring of ribbon-like form adjacent said cylindrical path and undulating in and out to shade alternate outer pole pieces, and a second shading member positioned adjacent said inner pole pieces and arranged to shade alternate inner pole pieces.

4. In a synchronous motor, a magnetic core, a magnetic field member mounted on one end of said core and having inner pole pieces extending radially outwardly therefrom and integrally joined to outer pole pieces disposed axially in a substantially cylindrical path, a second magnetic field member mounted on the other end of said core, the ends of the outer pole pieces remote from the first mentioned magnetic field member being secured to said second magnetic field member, a rotor rotatably mounted adjacent the integral joints between said pole pieces, and a shading ring of ribbon-like form adjacent said cylindrical path and undulating in and out to shade alternate outer pole pieces.

5. In a synchronous motor, a magnetic core, a magnetic field member mounted on one end of said core and having inner pole pieces extending radially outwardly therefrom and integrally joined to outer pole pieces disposed axially in a substantially cylindrical path, a second magnetic field member mounted on the other end of said core, the ends of the outer pole pieces remote from the first mentioned magnetic field member being secured to said second magnetic field member, a rotor rotatably mounted adjacent the integral joints between said pole pieces, a shading ring of ribbon-like form adjacent said cylindrical path and undulating in and out to shade alternate outer pole pieces, and a second shading ring positioned adjacent said inner pole pieces and arranged to shade alternate inner pole pieces.

6. In a synchronous motor, a magnetic core, a magnetic field member mounted on one end of said core and having radially extending pole pieces, said pole pieces being bent at positions intermediate their length downwardly to form axially extending pole pieces arranged in a substantially cylindrical path, a second magnetic field member mounted on the other end of said core, the free ends of said axially extending pole pieces being secured to said second magnetic field member, the cross sectional area of the bent portions of the pole pieces being less than the cross sectional area of the remaining portions of the pole pieces, and a rotor rotatably mounted adjacent said bent portions.

7. In a synchronous motor, a magnetic core, a magnetic field member mounted on one end of said core and having radially extending pole pieces, said pole pieces being bent at positions intermediate their length downwardly to form axially extending pole pieces arranged in a substantially cylindrical path, a second magnetic field member mounted on the other end of said core, the free ends of said axially extending pole pieces being secured to said second magnetic field member, the cross sectional area of the bent portions of the pole pieces being less than the cross sectional area of the remaining portions of the pole pieces, a rotor rotatably mounted adjacent said bent portions, and a shading ring of ribbon-like form adjacent said cylindrical path and undulating in and out to shade alternate outer pole pieces.

8. In a synchronous motor, a magnetic core, a magnetic field member mounted on one end of said core and having radially extending pole pieces, said pole pieces being bent at positions intermediate their length downwardly to form axially extending pole pieces arranged in a substantially cylindrical path, a second magnetic field member mounted on the other end of said core, the free ends of said axially extending pole pieces being secured to said second magnetic field member, the cross sectional area of the bent portions of the pole pieces being less than the cross sectional area of the remaining portions of the pole pieces, a rotor rotatably mounted adjacent said bent portions, a shading ring of ribbon-like form adjacent said cylindrical path and undulating in and out to shade alternate outer pole pieces, and a second shading ring having an undulating ribbon-like configuration positioned adjacent said inner pole pieces and arranged to shade alternate inner pole pieces.

9. In a synchronous motor, a magnetic core, a magnetic field member secured to one end of the core and having portions which extend first radially and then axially of the core, a magnetic disc secured to the other end of the core, said portions which extend axially of the core being secured to said disc, the cross section of the field member at positions where it changes from the radial to the axial direction being of smaller area than the cross section of the remaining portion of the field member, a coil surrounding said core, and a shading ring of ribbon-like form intertwining the axially extending field member portions.

10. In a synchronous motor, a magnetic core, a magnetic field member secured to one end of the core and having portions which extend first radially and then axially of the core, a magnetic disc secured to the other end of the core, said portions which extend axially of the core being secured to said disc, the cross section of the field member at positions where it changes from the radial to the axial direction being of smaller area than the cross section of the remaining portion of the field member, a coil surrounding said core, and a shading ring of ribbon-like form intertwining the radially extending field member portions.

WILLIAM L. HANSEN.
IRA N. HURST.